United States Patent [19]
Parker

[11] 4,285,480
[45] Aug. 25, 1981

[54] CASSETTE LOADING SYSTEM AND SELF-THREADING CASSETTE FOR USE THEREWITH

[75] Inventor: Ralph Parker, Melbourne Beach, Fla.

[73] Assignee: Harris Corporation, Melbourne, Fla.

[21] Appl. No.: 62,290

[22] Filed: Jul. 31, 1979

[51] Int. Cl.³ .......................... G03B 1/04; G11B 15/32
[52] U.S. Cl. ................................. 242/195; 352/157
[58] Field of Search ................ 242/67.1 R, 71.1, 76, 242/195, 71.7; 352/157, 158

[56] References Cited
U.S. PATENT DOCUMENTS

| | | | |
|---|---|---|---|
| 3,288,388 | 11/1966 | Winkler | 242/71.1 |
| 3,288,389 | 11/1966 | Gersch et al. | 242/71.1 |
| 3,322,366 | 5/1967 | Hayden | 242/71.1 |
| 4,060,210 | 11/1977 | Norris | 242/71.1 |
| 4,166,588 | 9/1979 | Krehbiel et al. | 242/67.1 R |

*Primary Examiner*—Leonard D. Christian
*Attorney, Agent, or Firm*—Craig and Antonelli

[57] ABSTRACT

A self-threading cassette for strip material and system for loading same is effective to tightly wind extended length materials of various types. No special adherent and interengaging surface characteristics are provided on a takeup reel within the cassette or on the strip material itself. Tightening of the lead ends of the strip material is achieved, according to a preferred embodiment, through the use of a takeup reel having at least portions of a high coefficient of friction material which cooperates with a leaf spring that is partially coiled about the takeup reel in a manner so as to cause the lead end of the strip material to coil about the takeup reel and gradually tighten thereon.

25 Claims, 4 Drawing Figures

U.S. Patent  Aug. 25, 1981  4,285,480
FIG. 1.
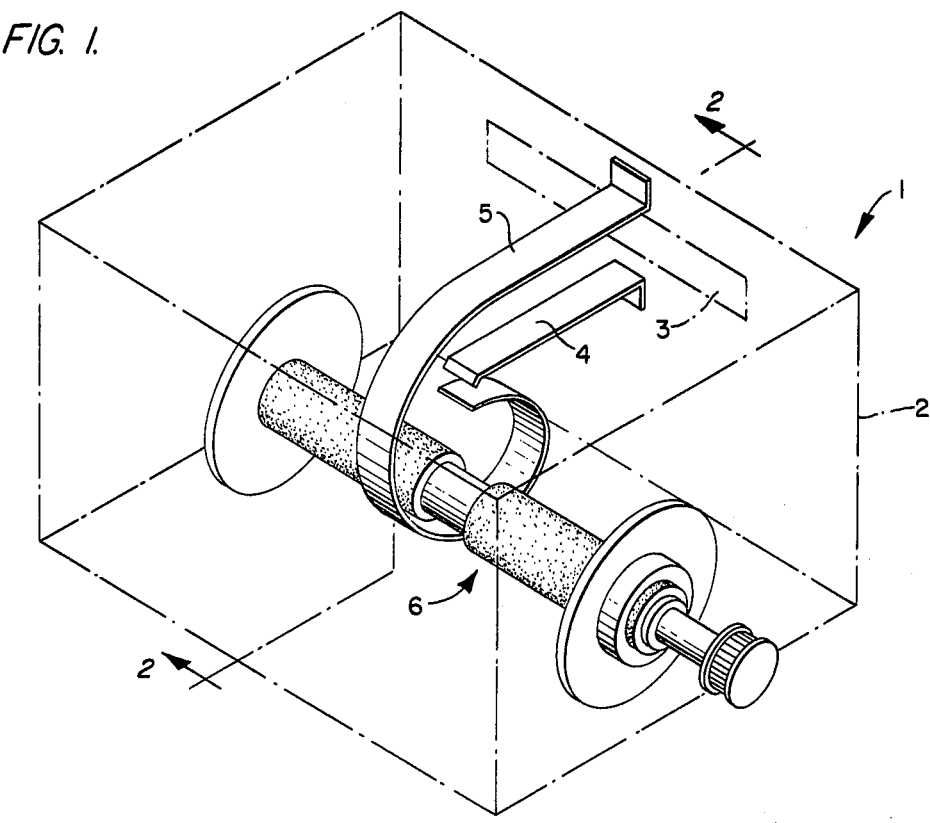
FIG. 2.
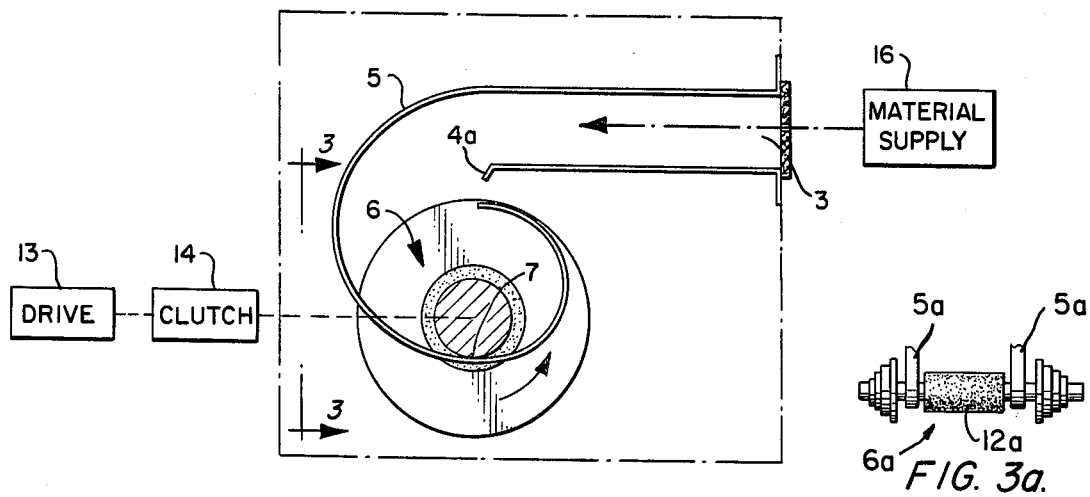
FIG. 3.
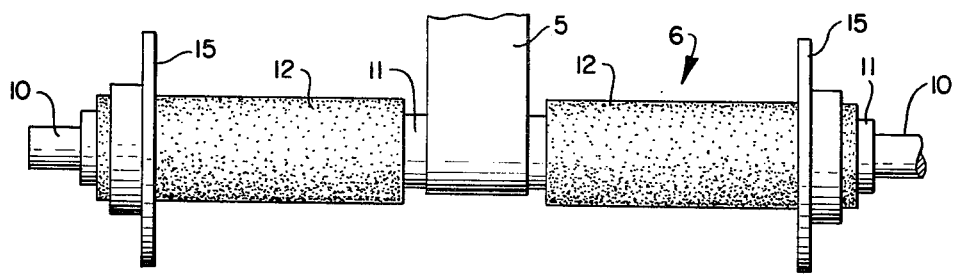
FIG. 3a.

CASSETTE LOADING SYSTEM AND SELF-THREADING CASSETTE FOR USE THEREWITH

FIELD OF THE INVENTION

The present invention relates to a cassette which will self-thread a free end of a strip of material into coupling engagement with a winding reel contained in the cassette, and a loading system for performing the loading of the cassette with strip material such as paper film of the type used in the photo-composition systems.

BACKGROUND OF THE INVENTION

Film cassettes within which film is wound without any manual threading of the film onto a reel have long been known (and also have been called magazines, or simply packages). In a first type of cassette, film is wound without the use of a takeup reel, the film merely being coiled within substantially circular spring members of flexible material which expand with the coiling of the film. Examples of such cassettes can be seen in U.S. Pat. Nos. 1,799,184 and 2,381,033.

However, this first type of prior art cassette has several disadvantages. Firstly, strip material, such as film, coiled upon itself within a generally circular spring cannot be wound into as tight a configuration as can be achieved with a takeup reel and, secondly, perhaps most importantly the frictional effect of the coil spring against the film being wound causes a binding of the film, such that the use of such magazines have been limited to films that are no more than approximately ten feet in length.

Cassettes or magazines wherein strip material is self-threaded upon a takeup reel have also been known for some time. Examples of such arrangements can be found in U.S. Pat. Nos. 2,878,283 and 3,550,882. In the arrangement described in U.S. Pat. No. 2,578,283, film is inserted into the cassette through an opening and is directed via a guide channel to a point where a spring or spring biased member presses the end of the film into contact with a takeup reel. The surface of the takeup reel is provided with a tacky adhesive on its periphery such that the end of the film will adhere to the takeup reel and thus can be tightly wound on the takeup reel upon rotation of the reel. However, the use of adhesive materials for retaining the lead end of the strip material to the takeup reel has the disadvantage that, with repeated use, the adhesive material loses some of its sticky qualities each time the film is unwound and removed from the cassette such that a point is reached when the takeup roller is no longer able to retain the lead end of the strip material. This effect requires replacement or discarding of the takeup reel, and results in jamming of the material within the cassette if the cassette is used without knowledge of the fact that the adhesive no longer has sufficient retaining capabilities.

In the self-threading cassette according to U.S. Pat. No. 3,550,882, a free end of a film having conventional sprocket holes along one longitudinal margin is guided to and into engagement with a takeup reel having matching sprockets. The threading guide is an arcuate spring-like member extending from an inlet opening of a cassette housing into resilient engagement with the takeup reel so that film entering the cassette housing will be guided to the takeup reel where the sprockets will mesh with the film after initial contact of the film with the reel. To prevent slack from developing in the film, which could cause its disengagement from the sprockets, a slipping type drive is utilized to rotate the cassette takeup reel at a speed that is faster than the speed at which the incoming end of the film is fed.

The self-threading cassette such as disclosed in U.S. Pat. No. 3,550,882 also has disadvantages. Firstly, and most importantly, such a self-threading cassette is limited to use with strip material, such as film, that has a longitudinal series of apertures running along one margin, and reduces the range of applicability of such a cassette. Additionally, due to the fact that the takeup reel is rotating at a speed faster than the incoming strip material, a sudden force will be applied to the apertures as the sprockets are initially engaged. Such a shock can damage the apertures and eventually lead to difficulties. On the other hand, should the apertures on the film fail to engage in the sprockets or become disengaged before the film is wound tightly upon the reel, threading and winding will not occur and jamming might occur since there is no guiding of the film strip after it is initially brought into contact with the winding reel.

SUMMARY OF THE INVENTION

Therefore, it is a general object of the present invention to overcome deficiencies, including those noted above, of prior art cassettes of a self-winding or self-threading type.

More specifically, it is an object of the present invention to provide a self-threading cassette which will cause a strip material to be retained upon a takeup reel within the cassette independent of any inherent and interengaging surface characteristics of the reel and strip material, such as surface adhesives and mating sprockets and apertures.

It is a further object of the present invention to provide a self-threading cassette which can effectively preclude jamming of the strip material to be wound within the cassette and does not require the leading portion of the strip material to remain in engagement with the takeup reel after initial contact therewith.

It is a still further object of the present invention to provide a self-winding cassette which can compactly load extended lengths of strip material.

Still another object of the present invention is to provide a self-threading cassette which will be usable with any form of strip material, whether apertured or not.

Yet another object of the present invention is to provide a cassette loading system which will effectively thread and wind strip material into a cassette.

BRIEF DESCRIPTION OF THE INVENTION

According to a preferred embodiment of the invention, a strip material is fed into an opening of a cassette housing containing a takeup reel. The takeup reel is driven via a slip clutch at a speed greater than the speed of the incoming strip material. To provide self-threading of the strip material onto the takeup reel, a guide arrangement is mounted in the cassette housing in the form of a spring member partially coiled about the takeup reel and in engagement with the takeup reel at an intermediate portion of the reel. The guide arrangement is so constructed and arranged relative to the takeup reel that the incoming end of the strip material is able to pass, in an unsecured manner, over and around the takeup reel until it gradually rolls up tight. Once the strip material is rolled tight upon the takeup reel winding of the remainder of the material occurs under a slight tension.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a perspective view showing the interior of a cassette in accordance with a preferred embodiment of the present invention;

FIG. 2 is a schematic illustration of the cassette loading system according to a preferred embodiment of the invention showing a central sectional view of the cassette according to FIG. 1; and FIGS. 3 and 3a are elevational views of two take-up reel and guide embodiments in accordance with the invention.

DETAILED DESCRIPTION OF THE PREFERRED EMBODIMENT

The self-threading cassette according to the illustrated preferred embodiment is indicated generally at 1 in FIG. 1. The cassette 1 has a housing 2 that is shown as being a rectangular prism, but which may be of other shapes such as a circular cylinder. The cassette housing 2 is provided with feed window 3 through which strip material enters into the cassette. When the cassette is to be used with light sensitive materials such as photocomposition paper films, the feed window is provided with a light seal which may be of any conventional type utilized on film cassettes and thus is not illustrated in detail.

Mounted within the cassette housing 2 on opposite sides of the feed window 3 are a pair of guides 4, 5. The guide 4 extends from below the feed inlet 3 to a point directly above a takeup reel 6 where it is provided with a downward sloping end portion 4a. Guide 4 ensures that the leading edge of the strip material does not curl downward until it has been advanced over the takeup reel 6. This guide can be formed of any suitable self-supporting material, such as metal or plastic.

Guide 5 is mounted above the feed window 3, extends across the cassette and coils partially about the takeup reel 6. The upper guide is preferably formed of spring steel configured so as to contact the roller at a point 7, as shown in FIG. 2, and then separate from the reel 6 and continue around the reel to a free end positioned above the takeup reel 6 and directed toward an intermediate coiled portion of the spring for reasons discussed in greater detail below.

The takeup reel 6, as best seen from FIGS. 2 and 3, is preferably a composite structure formed by a central shaft 10 an inner roller 11, and spaced outer rollers 12. The shaft 10 is connected to a drive motor 13 via a slip clutch 14 and is rotatably supported within the cassette casing in notches or other suitable bearings carried by or mounted in the walls of the cassette housing 2.

The inner roller 11 is fixed upon the shaft 10 so as to rotate therewith. The inner roller 11 is formed of a material having a low coefficient of friction such as vinyl.

The other rollers 12 are fixed upon the inner roller 11 so as to rotate therewith and be spaced from each other by an amount greater than the width of the upper guide 5 thereby forming a notch or recess within which the guide 5 can sit and rest upon the inner roller 11. In contrast to the inner roller 11 which is formed of a low friction material, the outer rollers 12 are formed of a material having a high coefficient of friction such as neoprene rubber.

In the illustrated embodiment, a pair of flanged side guides 15 are shown mounted upon the ends of the outer rollers 12 at a distance corresponding to the width of the strip material to be wound upon the reel 6 therebetween. These side guides 15 can be formed of aluminum, plastic, or the like, and force fit onto the ends of the outer rollers 12, as shown, or may be carried upon exposed ends of the inner roller 11 or the shaft 10. These side guides rotate with the takeup reel and serve to maintain lateral alignment of the strip material.

While the preferred takeup reel utilizes a pair of high friction rollers carried upon a low friction inner roller so as to both reduce frictional rubbing between the guide spring 5 at the contact point 7, prior to threading of the strip material, and ensure that a firm frictional driving contact is applied by the takeup reel 6 to the lead end of the strip material, a single solid rubber piece can be utilized without provision of a low friction recess.

The operation of the cassette and loading system according to the preferred embodiment will now be described. A feed drive 16 (of conventional construction) is disposed relative to the feed window 3 so as to automatically direct a lead end of the strip material through window 3, or the lead end can be manually inserted through the light shield of the inlet window and then the feed device can be actuated. The feed device 16 supplies strip material at, for example, one inch per second, and from the feed window, the lead end of the strip material is guided to the takeup reel by the guides 4, 5.

During this period of time the takeup roll is driven by the motor 13 via the clutch 14 at a speed approximately 10 percent greater than the feed speed, for example, 1.1 inches per second. Alternatively, the casette can be provided with a detecting switch which can actuate the drive motor upon insertion of a strip through the light seal of the feed window.

When the strip material passes into the nip 7 formed between the guide 5 and roller 6, the guide 5 is lifted out of the recess and applies sufficient force to the strip material against the rollers 12 as to ensure that a driving force is imparted. However, the lead edge of the strip material does not become secured to the roller in any manner and passes over the roller and is guided by the free end portion of the guide spring 5 around the roller back towards an intermediate portion of the guide spring upstream of the nip 7 where the following guided portions of the strip material and the arcuate form of the guide spring 5 serve to curl the leading end downward back toward the nip 7. This process is repeated, with the rollers 12 continuously driving the inside loop, thereby gradually rolling the strip material tightly about the takeup roll 6. In this manner, the lead end of the strip material will be tightly threaded about the takeup reel and retained without any adherent and interengaging surface characteristics having to be provided such as by adhesives and mating sprockets and holes.

Once the strip material has been tightly wound upon the takeup reel 6, the slip clutch will permit equalization of the speed of the takeup reel with that of the material fed into the cassette by the feed device 16. The 10 percent initial speed differential has been found to be particularly advantageous since it both reduces the extent of the yanking force applied upon the strip material when initially driven by the faster rotating takeup reel and reduces the amount of slip that must occur after threading has been completed, thereby avoiding damage to the strip material and limiting clutch wear, respectively.

Based upon tests, applicant has found that a single three quarter inch wide centrally positioned spring is sufficient to provide the necessary guiding of paper film, such as is used in photo-composition systems (such paper being usually 6 to 7 inches wide) to the takeup roller as well as applying sufficient force for the roller to drive the same, while being sufficiently able to flex and expand away from the roller as the paper film is wound about the roller. Furthermore, in contrast to reel-less spring coiling cassettes (which as noted above have been essentially limited to strip lengths of about 10 feet) the present invention has satisfactorily loaded as much as 150 feet of paper film within a cassette without the prior art binding problems occurring.

As noted above, a single three-quarter inch strip has been found to be satisfactory for use in accordance with the described cassette and loading system. However, it is also contemplated that a pair of such guide springs 5a could be utilized in conjunction with a pair of recesses as shown in FIG. 3a in connection with a modified take-up reel 6a. Such plural recesses could be formed, for example, by the ends of a single, centrally positioned, outer rubber roller 12a of lesser length than the inner roller 11 and the spacing between the side guides 15 (which then would be mounted upon the inner roller instead of the outer roller). Likewise, one of ordinary skill in the art will recognize that the present invention is not limited to the one embodiment shown and described herein, but is susceptible to numerous changes and modifications within the scope of the overall invention described herein. Therefore, I do not wish to be limited to the details shown and described herein, but intend to cover all such changes and modifications as are encompassed by the scope of the appended claims.

I claim:

1. A self-threading cassette for strip material comprising:
   a cassette housing having an opening through which said strip material is introduceable;
   a takeup reel rotatably mounted within said cassette housing; and
   guide means mounted in said cassette housing for directing said strip material introduced through said opening to said takeup reel and causing said strip material to pass in an unsecured manner over and around said takeup reel until the leading end of said strip is gripped between said reel and a remote portion of said strip material, said guide means being formed of a spring curved continuously around said reel so as to be urged against said reel at a nip portion between itself and said reel, the contour of said spring being curved upstream and downstream of said nip portion so as to be able to flex and expand away from said reel as said strip material is wound about said reel.

2. A self-threading cassette for strip material comprising:
   a cassette housing having an opening through which said strip material is introduceable;
   a takeup reel rotatably mounted within said cassette housing; and
   guide means mounted in said cassette housing for directing said strip material introduced through said opening to said takeup reel and causing said strip material to pass in an unsecured manner over and around said takeup reel until the leading end of said strip is gripped between said reel and a remote portion of said strip material, said guide means being formed of a plurality of springs curved continuously around said reel so as to be urged against said reel at respective nip portions between said springs and said reel, the contours of said springs being curved upstream and downstream of said respective nip portions so as to be able to flex and expand away from said reel as said strip material is wound about said reel.

3. A self-threading cassette loading system comprising:
   a self-threading cassette having a cassette housing with a takeup reel mounted therein, said cassette housing having an opening through which strip material is introduceable;
   supply means for feeding an indefinite length strip material into said cassette housing through said opening at a first speed;
   drive means mounted externally of said cassette for rotating said takeup reel; and
   clutch means interconnecting said drive means and said takeup reel for enabling said reel to be rotated by said drive means at a second speed greater than said first speed when said reel is empty and at said first speed after the threading of said strip material onto said reel, and wherein
   a guide means is mounted in said cassette housing for directing said strip material introduced through said opening to said takeup reel and causing said strip material to pass in an unsecured manner over and around said takeup reel until the loading end of said strip is gripped between said reel and a remote portion of said strip material, said guide means being formed of a spring curved continuously around said reel so as to be urged against said reel at a nip portion between itself and said reel, the contour of said spring being curved upstream and downstream of said nip portion so as to be able to flex and expand away from said reel as said strip material is wound about said reel.

4. A self-threading cassette according to claim 1, wherein said takeup reel is mounted on a first side of said opening and wherein said spring has a first end mounted to said housing adjacent a second side of said opening and extends from said first end about said takeup reel to a free, second end directed toward an intermediate portion of the spring, whereby a free end of said strip material will be caused to coil about said takeup reel after passing over said takeup reel between the spring and the reel.

5. A self-threading cassette according to claim 1, wherein said takeup reel has an outer surface formed at least in part of a material having a high coefficient of friction.

6. A self-threading cassette according to claim 5, wherein said takeup reel is provided with a circumferential surface portion formed of a material having a relatively low coefficient of friction, said spring engaging said reel at said low frictional surface portion.

7. A self-threading cassette according to claim 6, wherein said high friction coefficient material is rubber and said low friction coefficient material is vinyl.

8. A self-threading cassette according to claim 7, wherein said takeup reel comprises an inner roller formed of said vinyl and outer rollers of said rubber fixed upon said inner roller so as to leave a central portion of said inner roller exposed.

9. A self-threading cassette according to claim 8, comprising a lower guide member mounted on said first side of said opening and extending therefrom to an end positioned near said free second end of the spring and between said ends of the spring.

10. A self-threading cassette according to claim 9, wherein the end of the guide member is inclined toward the second end of the spring.

11. A self-threading cassette according to claim 4, comprising a lower guide member mounted on said first side of said opening and extending therefrom to an end positioned near said free second end of the spring and between said ends of the spring.

12. A self-threading cassette according to claim 11, wherein the end of the guide member is inclined toward the second end of the spring.

13. A cassette loading system according to claim 3, wherein said takeup reel is mounted on a first side of said opening and wherein said spring has a first end mounted to said housing adjacent a second side of said opening and extends from said first end about said takeup reel to a free, second end directed toward an intermediate portion of the spring, whereby a free end of said strip material will be caused to coil about said takeup reel after passing over said takeup reel between the spring and reel.

14. A cassette loading system according to claim 3, wherein said takeup reel has an outer surface formed at least in part of a material having a high coefficient of friction.

15. A cassette loading system according to claim 14, wherein said takeup reel is provided with a circumferential surface portion formed of a material having a relatively low coefficient of friction, said spring engaging said reel at said low frictional surface portion.

16. A cassette loading system according to claim 15, wherein said high friction coefficient material is rubber and said low friction coefficient material is vinyl.

17. A cassette loading system according to claim 16, wherein said takeup reel comprises an inner roller formed of said vinyl and outer rollers of said rubber fixed upon said inner roller so as to leave a central portion of said inner roller exposed.

18. A cassette loading system according to claim 17, comprising a lower guide member mounted on said first side of said opening and extending therefrom to an end positioned near said free second end of the spring and between said ends of the spring.

19. A cassette loading system according to claim 18, wherein the end of the guide member is inclined toward the second end of the spring.

20. A cassette loading system according to claim 18, comprising a lower guide member mounted on said first side of said opening and extending therefrom to an end positioned near said free second end of the spring and between said ends of the spring.

21. A cassette loading system according to claim 20, wherein the end of the guide member is inclined toward the second end of the spring.

22. A cassette loading system according to claim 3 or 15, wherein said second speed exceeds said first speed by approximately 10 percent.

23. A cassette loading system according to claim 22, wherein said first speed is approximately one inch per second.

24. A cassette loading system according to claim 3, wherein said strip material is paper film as used in photo composition printing systems.

25. A self-threading cassette loading system comprising:
a self-threading cassette having a cassette housing with a takeup reel mounted therein, said cassette housing having an opening through which strip material is introduceable;
supply means for feeding an indefinite length strip material into said cassette housing through said opening at a first speed;
drive means mounted externally of said cassette for rotating said takeup reel; and
clutch means interconnecting said drive means and said takeup reel for enabling said reel to be rotated by said drive means at a second speed greater than said first speed when said reel is empty and at said first speed after the threading of said strip material onto said reel, and wherein
a guide means is mounted in said cassette housing for directing said strip material introduced through said opening to said takeup reel and causing said strip material to pass in an unsecured manner over and around said takeup reel until the leading end of said strip is gripped between said reel and a remote portion of said strip material, said guide means being formed of a plurality of springs curved continuously around said reel so as to be urged against said reel at respective nip portions between said springs and said reel, the contours of said springs being curved upstream and downstream of said respective nip portions so as to be able to flex and expand away from said reel as said strip material is wound about said reel.

* * * * *